United States Patent
Kang et al.

(10) Patent No.: US 7,075,199 B2
(45) Date of Patent: Jul. 11, 2006

(54) RECIPROCATING MOTOR AND RECIPROCATING COMPRESSOR HAVING THE SAME

(75) Inventors: Je-Nam Kang, Seoul (KR); Gye-Young Song, Gyeonggi-Do (KR); Hyeong-Kook Lee, Gyeonggi-Do (KR); Yong-Su Kim, Seoul (KR); Kyeong-Bae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/039,912

(22) Filed: Jan. 24, 2005

(65) Prior Publication Data

US 2006/0017332 A1 Jan. 26, 2006

(30) Foreign Application Priority Data

Jul. 26, 2004 (KR) ............... 10-2004-0058382

(51) Int. Cl.
*F04B 53/12* (2006.01)
(52) U.S. Cl. ............ 310/15; 310/12; 417/312; 417/360
(58) Field of Classification Search .......... 310/15, 310/17, 26, 28, 12; 417/360, 312
See application file for complete search history.

(56) References Cited

U.S. PATENT DOCUMENTS

| 4,761,960 | A  | * | 8/1988  | Higham et al. ............ 62/6 |
| 4,924,675 | A  | * | 5/1990  | Higham et al. ............ 62/6 |
| 6,174,141 | B1 | * | 1/2001  | Song et al. ............ 417/312 |
| 6,455,971 | B1 | * | 9/2002  | Palma et al. ............ 310/180 |
| 6,491,506 | B1 | * | 12/2002 | Oh et al. ............ 417/417 |
| 6,755,627 | B1 | * | 6/2004  | Chang ............ 417/417 |
| 2002/0057973 | A1 | * | 5/2002 | Choi et al. ............ 417/415 |
| 2003/0137209 | A1 | * | 7/2003 | Do et al. ............ 310/194 |
| 2004/0145248 | A1 | * | 7/2004 | Jung et al. ............ 310/15 |
| 2004/0239192 | A1 | * | 12/2004 | Lilie ............ 310/12 |
| 2005/0057101 | A1 | * | 3/2005 | Nakagawa et al. ............ 310/12 |

* cited by examiner

*Primary Examiner*—Darren Schuberg
*Assistant Examiner*—Erik Preston
(74) *Attorney, Agent, or Firm*—Birch, Stewart, Kolasch & Birch, LLP

(57) ABSTRACT

Disclosed are a reciprocating motor and a reciprocating compressor having the same. The reciprocating motor comprises: an outer stator; an inner stator arranged at an inner circumferential surface of the outer stator with an air gap and at which a winding coil is wound; and a magnet arranged between the outer stator and the inner stator and linearly-moved when a power is applied to the winding coil. The winding coil is installed at the inner stator thus to reduce a usage amount of the coil, thereby reducing a fabrication cost of a motor. Also, a resistance of the coil is reduced thereby to enhance an efficiency of the motor.

7 Claims, 8 Drawing Sheets

RECIPROCATING MOTOR AND RECIPROCATING COMPRESSOR HAVING THE SAME

BACKGROUND OF THE INVENTION

1. Field of the Invention

The present invention relates to a reciprocating compressor, and more particularly, to a reciprocating motor that a winding coil is wound at an inner stator and a reciprocating compressor having the same.

2. Description of the Conventional Art

FIG. 1 is a section view showing a reciprocating compressor in accordance with the conventional art.

The conventional reciprocating compressor comprises: a hermetic casing 106; a reciprocating motor 108 installed in the casing 106 and generating a reciprocation force; and a compression unit 110 for compressing a fluid by receiving a reciprocation force from the reciprocating motor 108.

A suction pipe 102 for sucking a fluid and a discharge pipe 104 for discharging a compressed fluid are respectively connected to the casing 106, and frames 112, 114 and 116 for supporting the compression unit 110 and the reciprocating motor 108 are mounted in the casing 106.

The frames are composed of a first frame 112 for supporting a front side of the reciprocating motor 108; a second frame 114 coupled to the first frame 112 and supporting a rear side of the reciprocating motor 108; and a third frame 116 coupled to the second frame 114 and supporting a resonance spring 136.

As shown in FIG. 2, the reciprocating motor 108 is composed of: an outer stator 120 fixed between the first frame 112 and the second frame 114; an inner stator 122 arranged with a certain air gap from an inner circumferential surface of the outer stator 120; a winding coil 124 arranged at the inner circumferential surface of the outer stator 120 and to which an external power is applied; and a magnet 126 arranged between the outer stator 120 and the inner stator 122 with a certain interval and linearly-reciprocated when a power is applied to the winding coil 124.

The outer stator 120 is formed accordingly as core blocks that a plurality of lamination sheets are laminated are arranged with the same interval in a circumferential direction thereof. A bobbin 128 is fixed to an inner side surface of the core blocks, and the winding coil 124 is wound on the bobbin 128.

The inner stator 122 has a cylindrical shape that a plurality of lamination sheets are laminated, and is fixed to an outer circumferential surface of a cylinder 130 of the compression unit 110.

The magnet 126 is fixed to an outer circumferential surface of a magnet frame 132 with the same interval, and the magnet frame 132 is connected to a piston 140 of the compression unit 110. Also, a spring supporting bar 142 is connected to the piston 140. As the magnet 126, an NdFeB based magnet having a high coercive force is used.

A first resonance spring 134 is installed between the spring supporting bar 142 and the second frame 114 for supporting the outer stator 120, and the second resonance spring 136 is installed between the spring supporting bar 142 and the third frame 116 thereby to induce a resonant motion of the piston 140.

The compression unit 110 is composed of: the piston 140 connected to the magnet frame 126 thus to be linearly-moved; the cylinder 130 to which the piston 140 is slidably inserted, having a compression chamber 143, and fixed to the first frame 112; a suction valve 146 mounted at a front side of the piston 140, for opening and closing a fluid passage 144 formed at the piston 140; and a discharge valve assembly mounted at a front side of the cylinder 130, for discharging a fluid by opening the compression chamber 143 when a pressure inside the compression chamber 143 reaches a certain level.

The discharge valve assembly is composed of: a discharge valve 148 adhered to a front surface of the cylinder 130 thus to be opened and closed; a discharge cover 150 mounted at a front side of the cylinder 130 and connected to the discharge pipe 104; and a spring 152 installed between an inner surface of the discharge cover 150 and the discharge valve 148, for elastically supporting the discharge valve 148.

An operation of the conventional reciprocating compressor will be explained as follows.

When the electric power is applied to the winding coil 124, a flux is formed around the winding coil 124. The flux forms a closed loop along with the outer stator 120 and the inner stator 122. By an interaction between the flux formed between the outer stator 120 and the inner stator 122 and a flux formed by the magnet 126, the magnet 126 is linearly-moved in an axial direction. When a direction of a current applied to the winding coil 124 is alternately changed, a direction of the flux of the winding coil 124 is changed and thereby the magnet 126 is linearly-reciprocated.

As the magnet 126 is moved, the magnet frame 132 to which the magnet 126 is fixed is linearly-reciprocated thereby to linearly-reciprocate the piston 140. According to this, a fluid sucked through the suction pipe 102 is introduced into the compression chamber 143 through the fluid passage 144 of the piston 140, and the fluid that has been introduced into the compression chamber 143 is compressed by the reciprocation of the piston 140 and is discharged to the outside through the discharge pipe 104.

However, the conventional reciprocating compressor has the following problems. First, since the expensive NdFeB based magnet is used as a magnet, the winding coil is arranged at the outer stator in order to reduce a usage amount of the magnet. However, arranging the winding coil at the outer stator causes the winding coil to be unnecessarily much used thereby to increase a fabrication cost.

Also, since the winding coil is arranged on the outer stator, the number of windings of the coil is increased. According to this, a resistance of the coil is increased thereby to cause a loss of the motor.

SUMMARY OF THE INVENTION

Therefore, an object of the present invention is to provide a reciprocating motor capable of reducing a fabrication cost of a motor by reducing a usage amount of a coil by installing a winding coil at an inner stator and capable of enhancing an efficiency of a motor by lowering a resistance of the coil and a reciprocating compressor having the reciprocating motor.

To achieve these and other advantages and in accordance with the purpose of the present invention, as embodied and broadly described herein, there is provided a reciprocating motor comprising: an outer stator; an inner stator arranged at an inner circumferential surface of the outer stator with an air gap and at which a winding coil is mounted; and a magnet arranged between the outer stator and the inner stator and linearly-moved when a power is applied to the winding coil.

The outer stator is formed accordingly as core blocks that a plurality of lamination sheets are laminates are arranged in a radial direction with the same interval.

The inner stator is composed of: a first stator core that a plurality of lamination sheets are laminated in a radial direction; and a second core facing the first stator core and formed accordingly as a plurality of lamination sheets are laminated in a radial direction. A winding coil is wound at an outer circumferential surface between the first stator core and the second stator core.

The winding coil is composed of: a first winding coil wound on a first bobbin mounted at an outer circumferential surface of the inner stator; and a second winding coil wound on a second bobbin mounted at an outer circumferential surface of the first bobbin.

To achieve these and other advantages and in accordance with the purpose of the present invention, as embodied and broadly described herein, there is also provided a reciprocating compressor comprising: a hermetic casing; a reciprocating motor arranged in the casing and generating a reciprocation force; a compression unit for compressing a fluid by receiving a reciprocation force from the reciprocating motor; and frames for supporting the reciprocating motor and the compression unit, wherein the reciprocating motor includes: an outer stator supported by the frames; an inner stator arranged at an inner circumferential surface of the outer stator with an air gap and at which a winding coil is wound; and a magnet arranged between the outer stator and the inner stator and linearly-moved when a power is applied to the winding coil.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, one embodiment of a reciprocating compressor according to the present invention will be explained as follows.

Even if there may exist a plurality of preferred embodiment of the reciprocating compressor in the present invention, the most preferred embodiment will be explained as follows.

Figure 1:
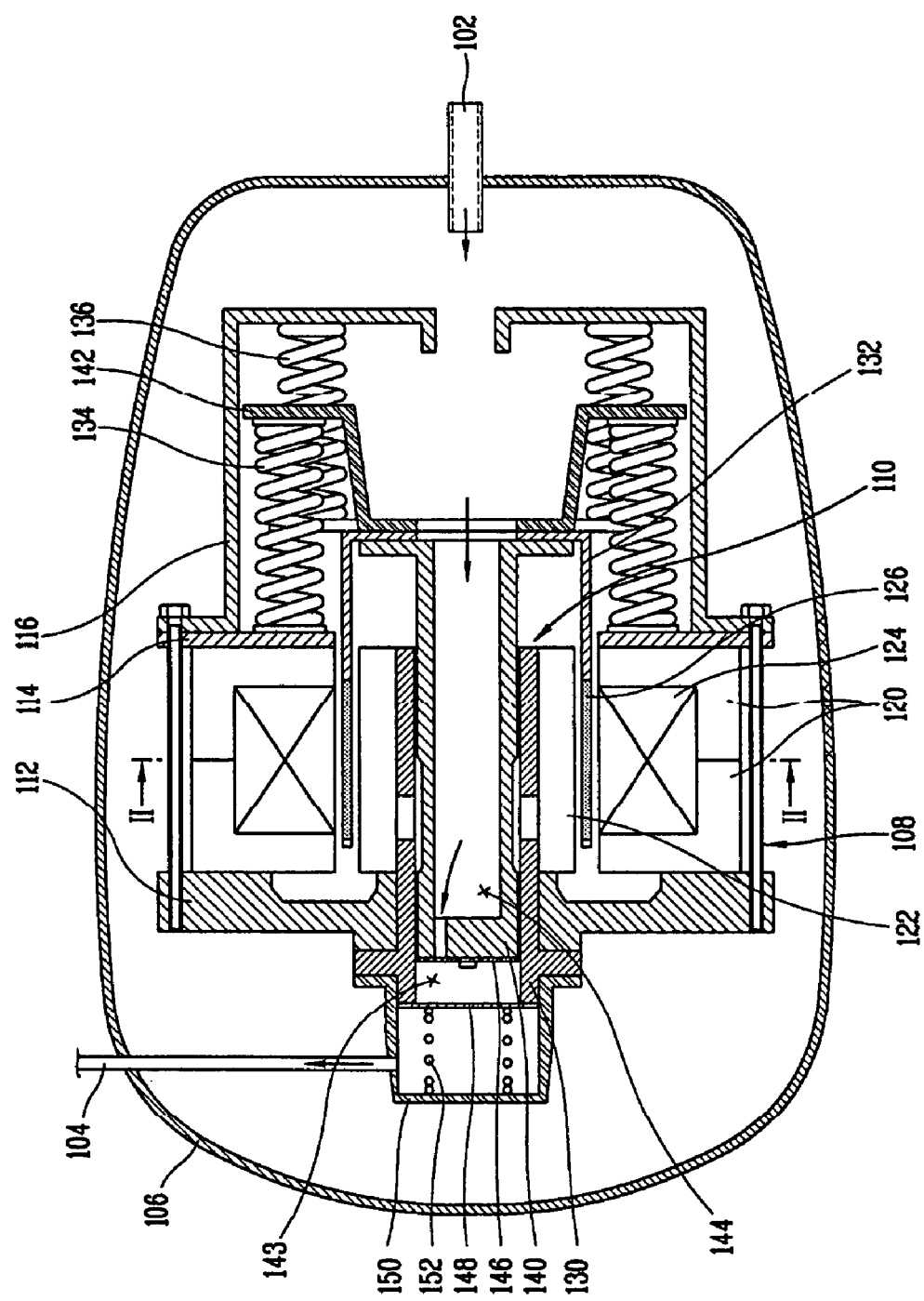
FIG. 1 is a section view showing a reciprocating compressor in accordance with the conventional art.
Figure 2:
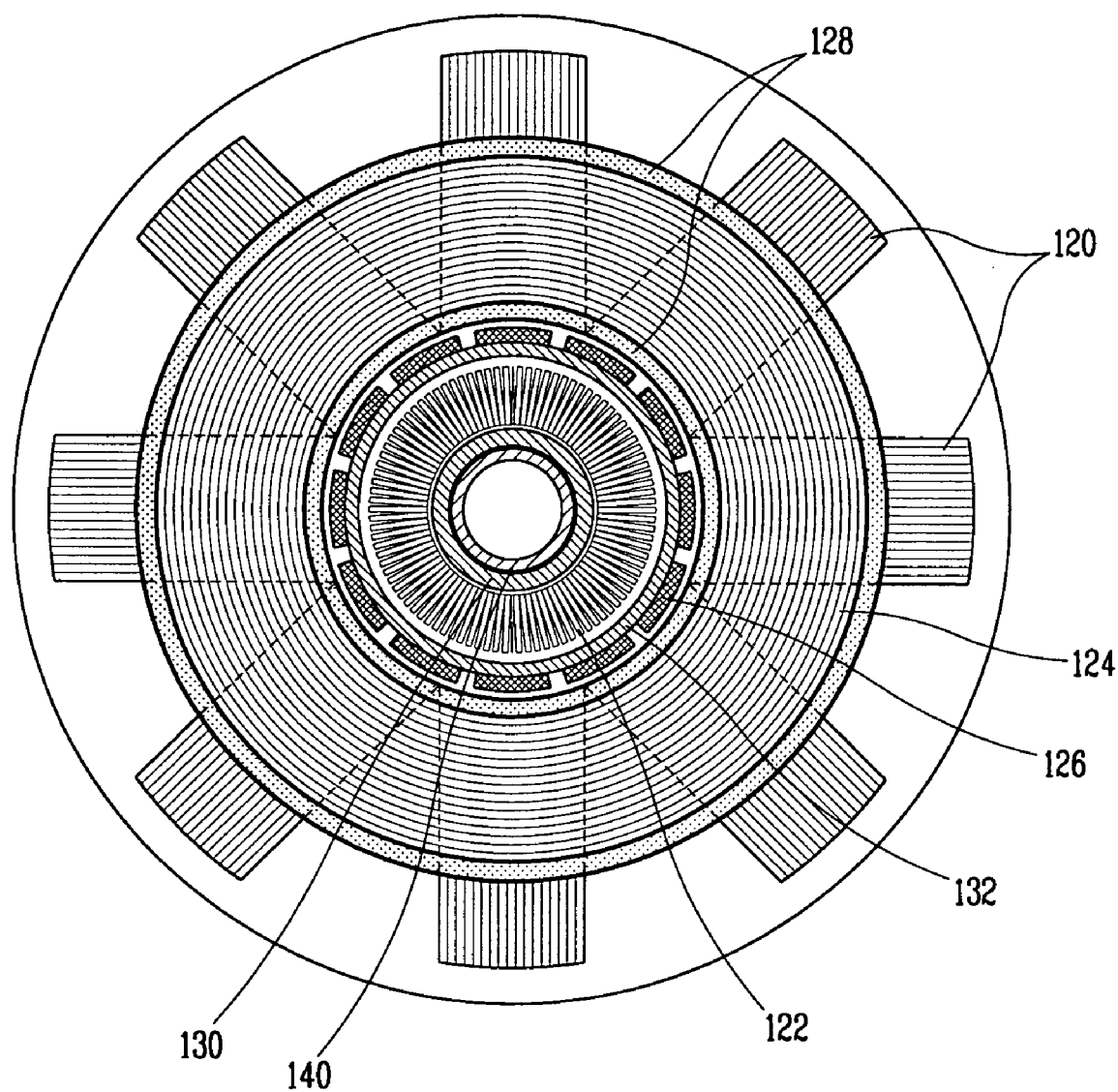
FIG. 2 is a section view taken along line II—II of FIG. 1.
Figure 3:
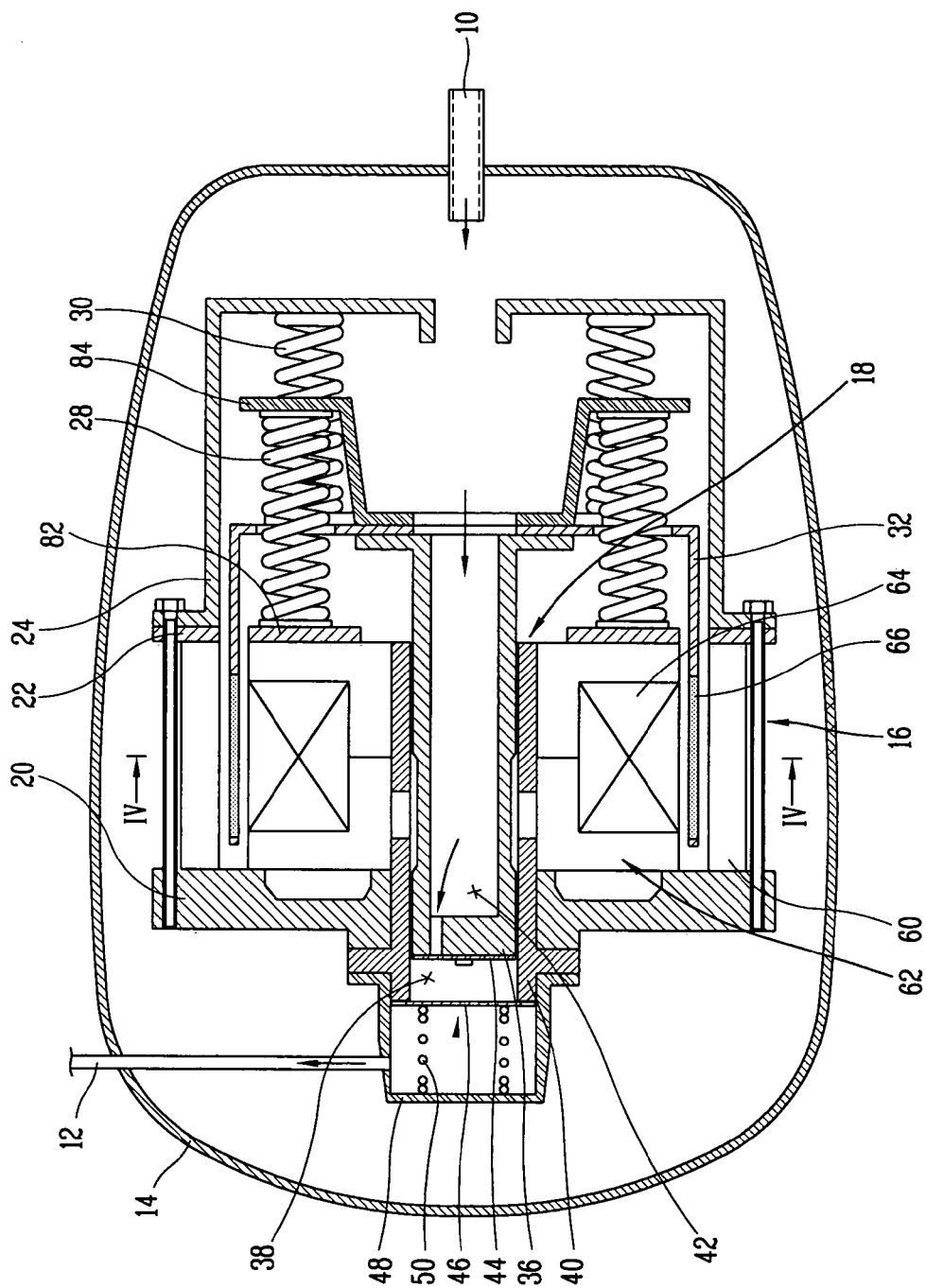
FIG. 3 is a section view showing a reciprocating compressor according to one embodiment of the present invention.

FIG. 3 is a section view showing a reciprocating compressor according to one embodiment of the present invention.

The reciprocating compressor according to the present invention comprises: a casing 14 having a hermetic space and to which a suction pipe 10 for sucking a fluid and a discharge pipe 12 for discharging a compressed fluid are respectively connected; a reciprocating motor 16 arranged in the casing 14 and generating a reciprocation force when the electric power is applied thereto; a compression unit 18 for compressing a fluid by receiving a reciprocation force generated from the reciprocating motor 16; and frames 20, 22, and 24 for supporting the reciprocating motor 16 and the compression unit 18.

The frames are composed of: a first frame 20 for supporting one side surface of the reciprocating motor 16; a second frame 22 coupled to the first frame 20 and supporting another side surface of the reciprocating motor 16; and a third frame 24 connected to the second frame 22 and supporting a resonance spring 30.

The compression unit 18 is composed of: a piston 36 connected to a magnet frame 32 of the reciprocating motor 16 thus to be linearly-moved; a cylinder 40 into which the piston 36 is slidably inserted, having a compression chamber 38, and fixed to the first frame 20; a suction valve 44 mounted at a front side of the piston 36, for opening and closing a fluid passage 42 formed at the piston 36; and a discharge valve assembly mounted at a front side of the cylinder 40, for discharging a fluid by opening the compression chamber 38 when a pressure inside the compression chamber 38 reaches a certain level.

The discharge valve assembly is composed of: a discharge valve 46 adhered to a front surface of the cylinder 40 thus to be opened and closed; a discharge cover 48 mounted at a front side of the cylinder 40 and connected to the discharge pipe 12; and a spring 50 installed between an inner surface of the discharge cover 48 and the discharge valve 46, for elastically supporting the discharge valve 46.

Figure 4:
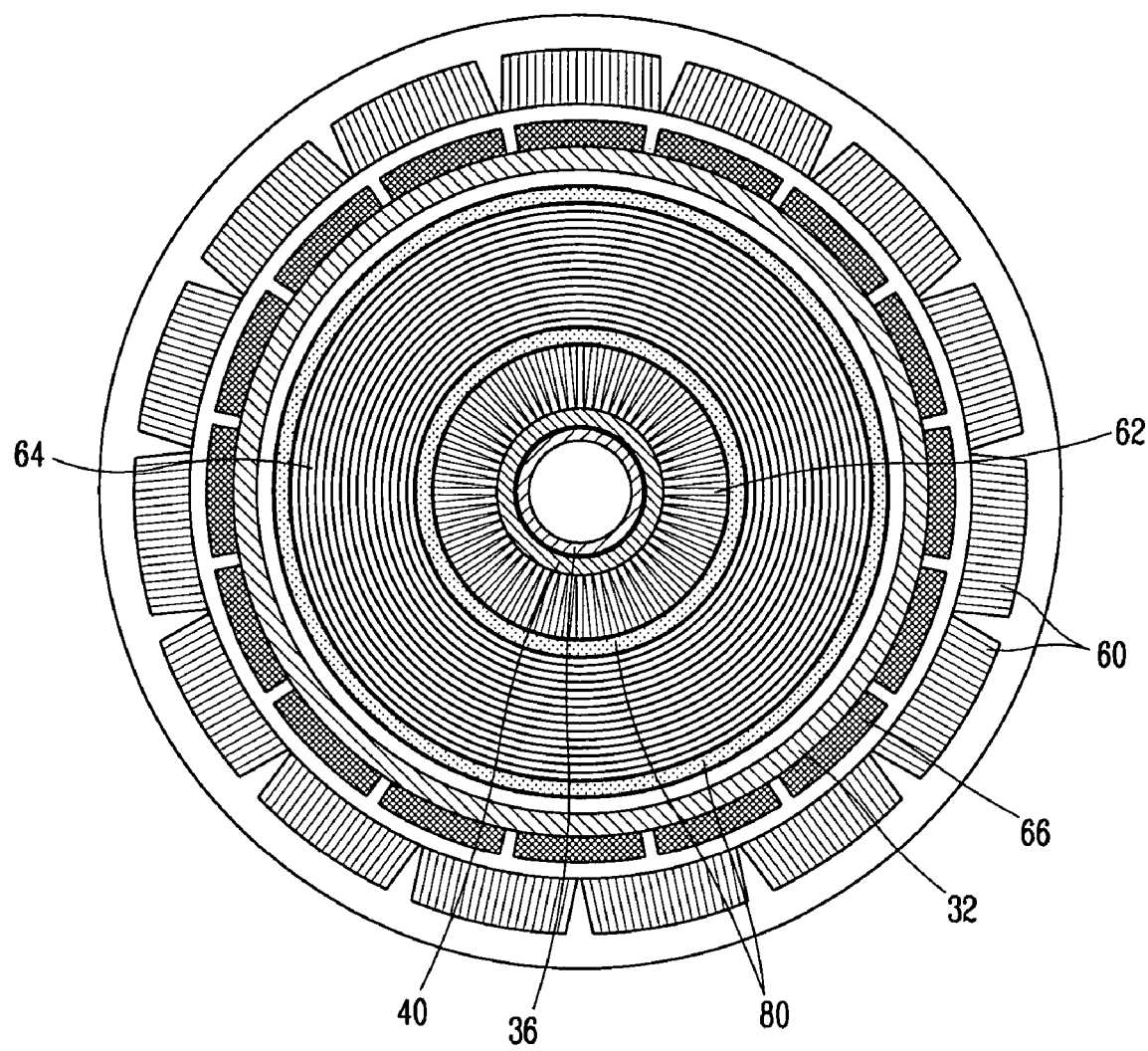
FIG. 4 is a section view taken along line IV—IV of FIG. 3.

As shown in FIG. 4, the reciprocating motor 16 is composed of: an outer stator 60 fixed between the first frame 20 and the second frame 22; an inner stator 62 arranged at an inner circumferential surface of the outer stator 60 with an air gap; a winding coil 64 arranged at an outer circumferential surface of the inner stator 62 and to which the electric power is applied from the outside; and a magnet 66 arranged between the outer stator 60 and the inner stator 62 with a certain interval thus to be linearly reciprocated when the electric power is applied to the winding coil 64.

The outer stator 60 is formed accordingly as core blocks that a plurality of lamination sheets are laminated are arranged in a circumferential direction with the same interval. As another embodiment, the outer stator 60 can be formed as a cylindrical shape by laminating a plurality of lamination sheets in a radial direction. One side surface of the outer stator 60 is supported at the first frame 20, and another side surface thereof is supported at the second frame 22.

Figure 5:
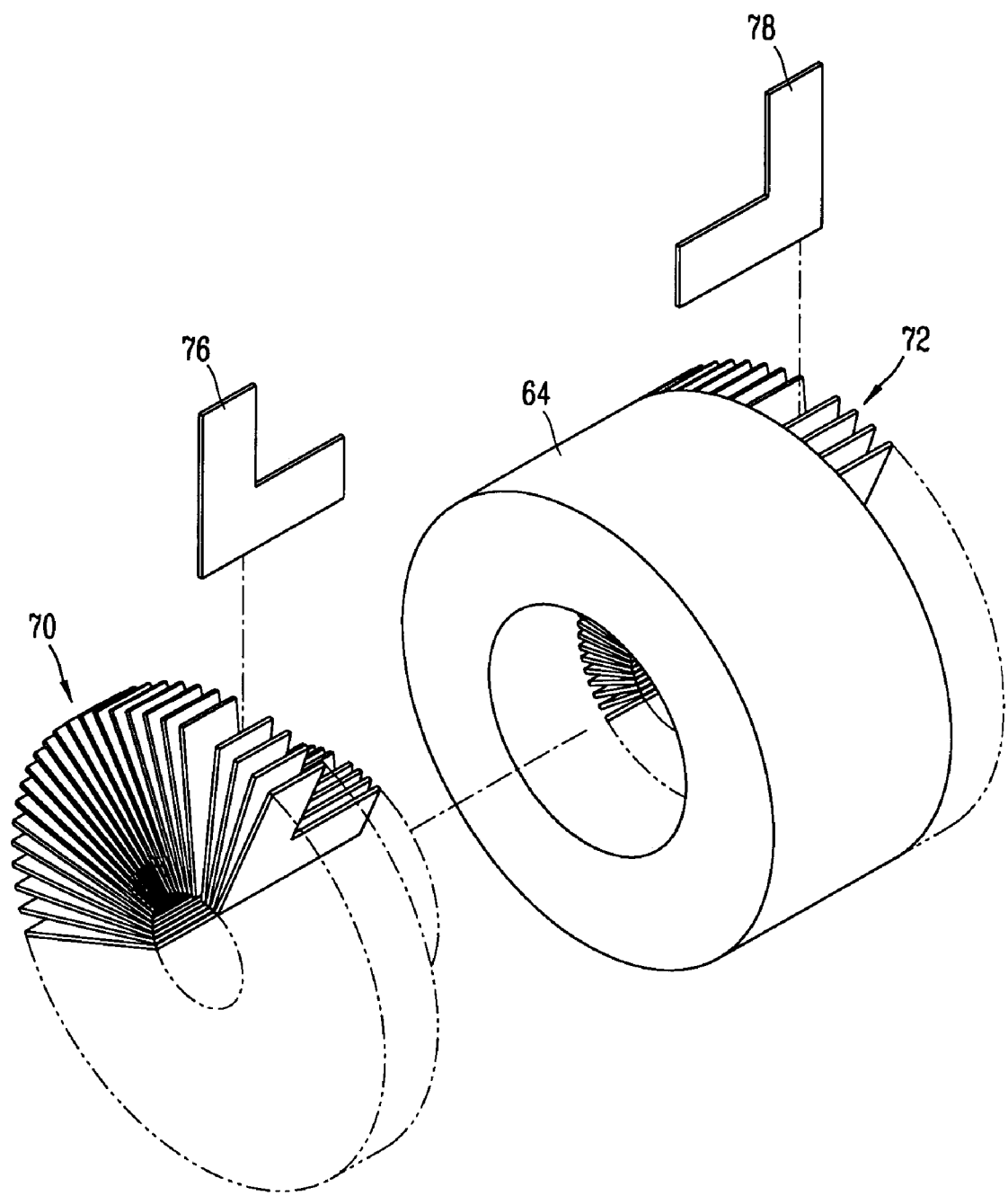
FIG. 5 is a disassembled perspective view showing an inner stator of a reciprocating motor according to the present invention.
Figure 6:
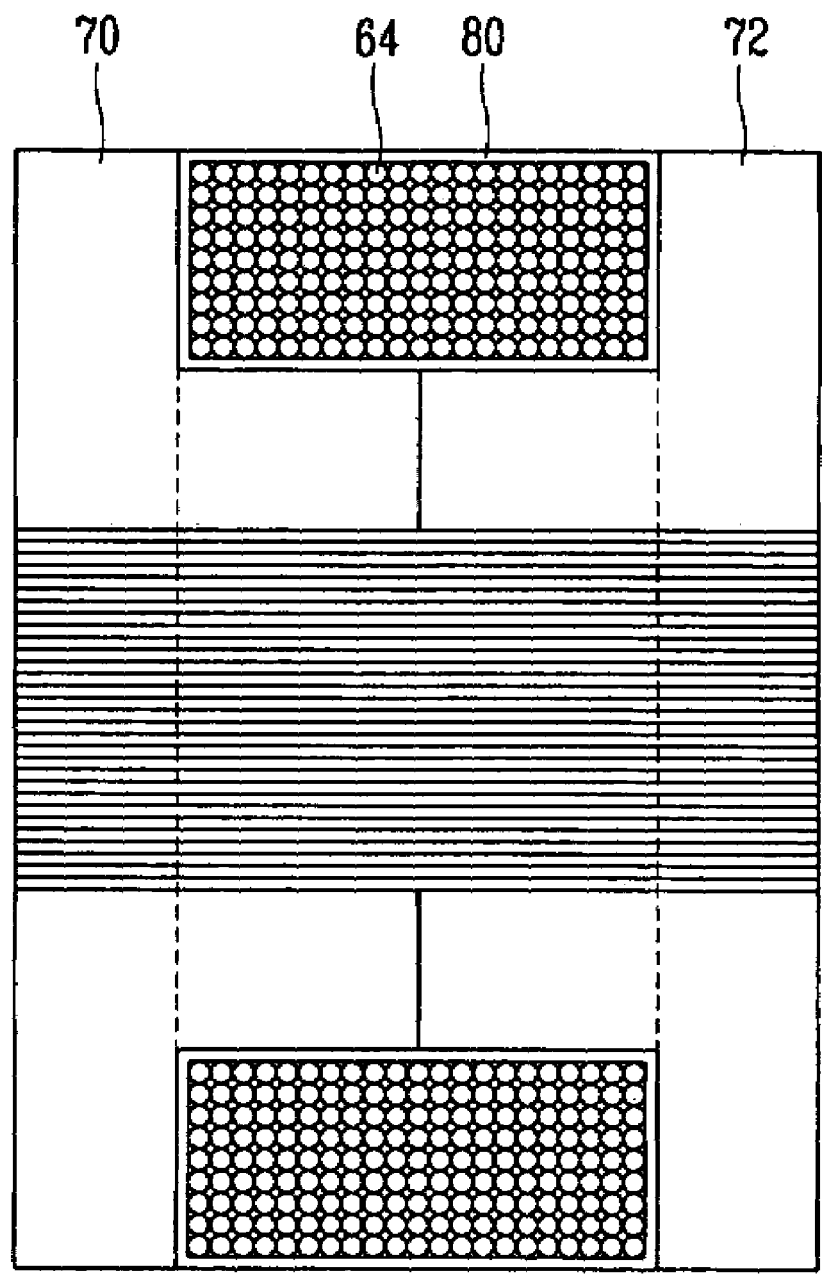
FIG. 6 is a section view showing the inner stator of the reciprocating motor according to the present invention.

As shown in FIG. 5 and in FIG. 6, the inner stator 62 is composed of: a first stator core 70 formed as a cylindrical shape by laminating a plurality of lamination sheets 76 bent as a right angle in a radial direction; and a second stator core 72 facing the first stator core 70 to be in contact with the first stator core 70 and formed as a cylindrical shape by laminating a plurality of lamination sheets 78 in a radial direction. A bobbin 80 is mounted at an outer circumferential surface of a relatively small diameter between the first stator core 70 and the second stator core 72, and the winding coil 64 is wound on an outer circumferential surface of the bobbin 80.

That is, the first stator core 70 an the second stator core 72 are laminated in a radial direction at the inner circumferential surface of the bobbin 80 on which the winding coil 64 is wound in a state that the first stator core 70 and the second stator core 72 face each other thereby to form a cylindrical shape.

The inner circumferential surface of the cylindrical inner stator 62 is fixed to the outer circumferential surface of the cylinder 40 by a pressing method. Also, one side surface of the inner stator 62 is supported by the first frame 20, and a spring seat 82 for supporting a resonance spring 28 is mounted at another side surface of the inner stator 62.

As another embodiment, the inner stator 62 is formed by arranging core blocks that a plurality of lamination sheets are laminated with the same interval in a radial direction, a bobbin is fixed to an outer circumferential surface of the core blocks, and a winding coil is wound on the bobbin.

Figure 7:
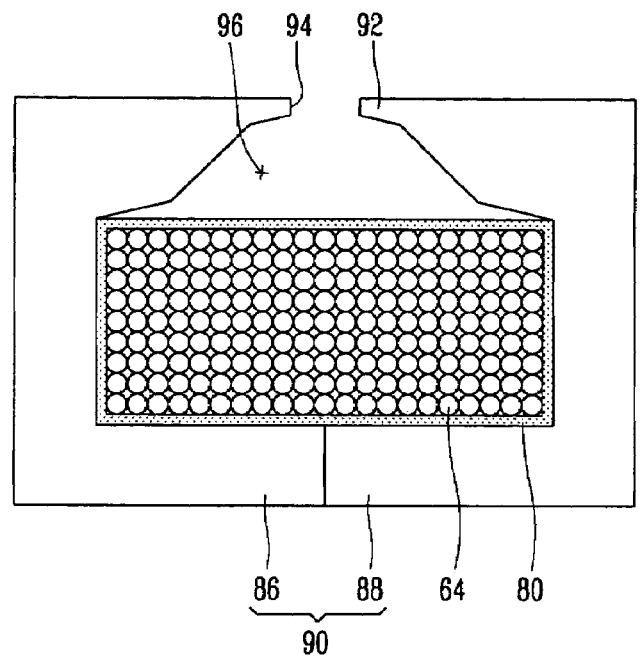
FIGS. 7 and 8 are half-section views showing an inner stator according to another embodiment of the present invention.
Figure 8:
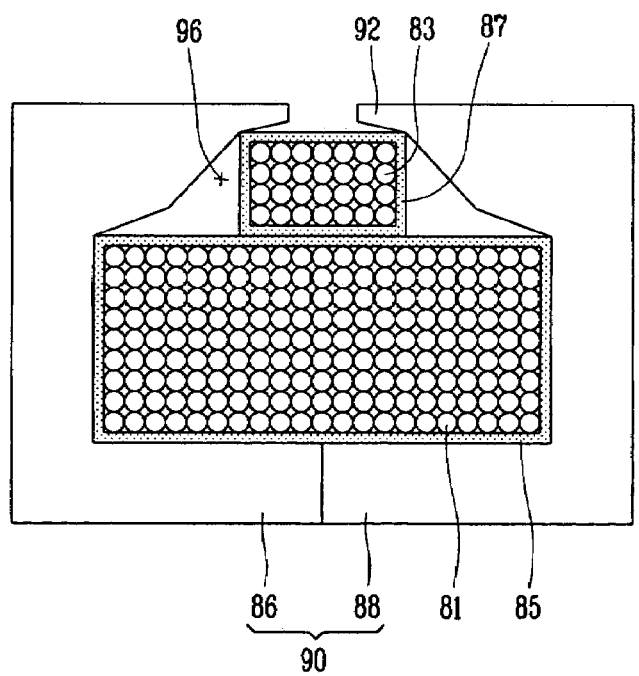

FIGS. 7 and 8 are half-section views showing an inner stator in which a coil is mounted according to another embodiment of the present invention.

As still another embodiment, the inner stator is composed of: a first stator core 86 formed by laminating lamination sheets in a radial direction; and a second stator core 88 arranged to face the first stator core 86, and a hermetic winding coil 64 wound on the bobbin 80 is mounted at an inner side of the inner stator. A pole portion 92 of the first stator core 86 and the second stator core 88 is extended to a direction that the winding coil 64 is wound thereby to form an opening portion 94, and a certain space portion 96 is formed at an inner side of the pole portion 92.

As shown in FIG. 7, one winding coil 64 can be mounted at an inner circumferential surface of an inner stator 90. Also, as shown in FIG. 8, it is possible that a first winding coil 81 is mounted at an inner side of the inner stator 90, and a second winding coil 83 having a sectional area different from that of the first winding coil 81 and arranged at an outer circumferential surface of the first winding coil 81 is mounted at the space portion 96 of the inner stator 90.

The first winding coil 81 and the second winding coil 83 can be respectively wound on a first bobbin 85 and a second bobbin 87. As another embodiment, the first winding coil 81 and the second winding coil 87 can be wound on one bobbin with a different sectional area.

The magnet 66 is fixed to an outer circumferential surface of the magnet frame 32 with the same interval, the magnet frame 32 is connected to the piston 36 of the compression unit 18, and a spring supporting bar 84 is connected to the piston 36.

As the magnet 66, a ferrite based magnet having a low price and a high coercive force is used thereby to reduce a fabrication cost.

The magnet 66 can be arranged at the outer circumferential surface of the magnet frame 32 with the same interval, or can be fixed to the outer circumferential surface of the magnet frame 32 as a cylindrical shape.

Figure 9:
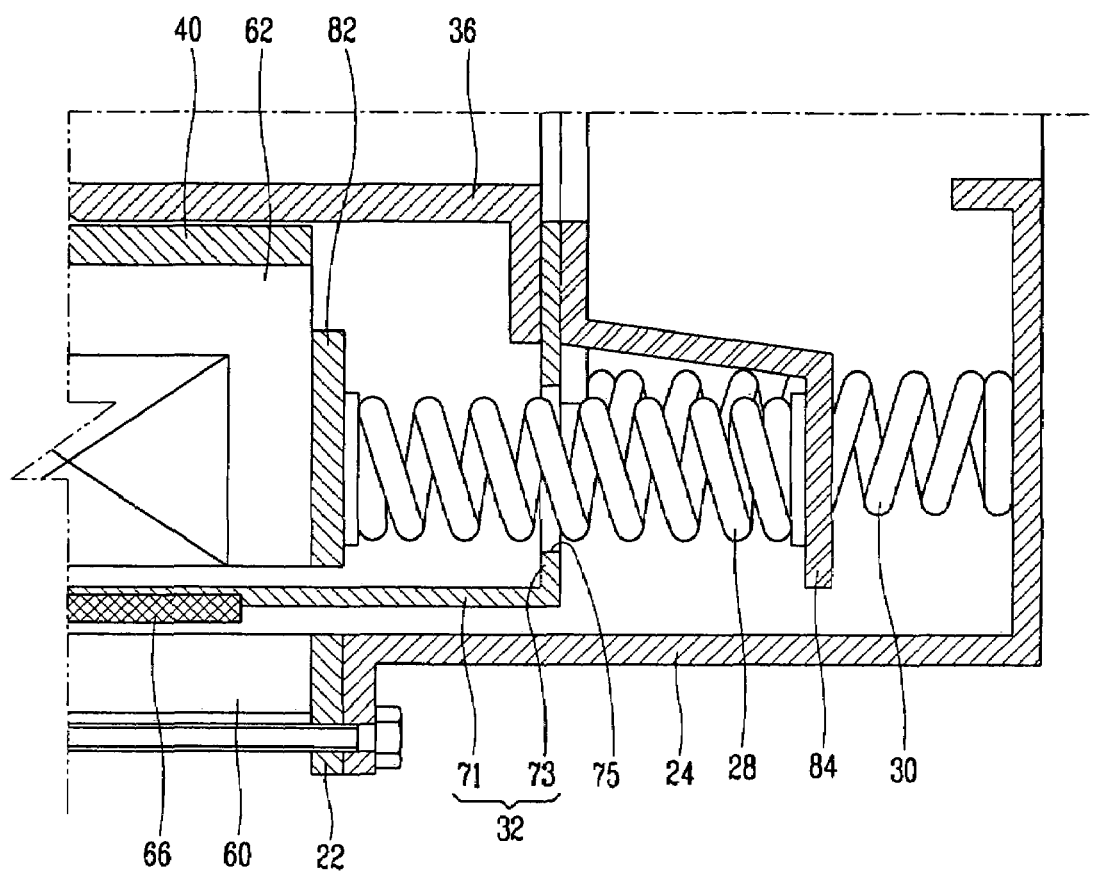
FIG. 9 is a section view showing a state that an inner stator of a reciprocating motor according to the present invention is mounted at a reciprocating compressor.

As shown in FIG. 9, the magnet frame 32 is composed of: a magnet mounting portion 71 for fixing the magnet; and a piston connection portion 73 connected to the piston 36.

Also, a through hole 75 for passing the first resonance spring 28 is respectively formed at both sides of the magnet frame 32. The magnet mounting portion 71 is formed of a non-magnetic substance, and the piston connection portion 73 is formed of a magnetic substance. More concretely, the magnet mounting portion 71 is formed of a fiber material, and the piston connection portion 73 is formed of a metal material thereby to reduce a loss of a motor.

The first resonance spring 28 is installed between the spring supporting bar 84 and one side surface of the inner stator 62, and the second resonance spring 30 is installed between the spring supporting bar 84 and the third frame 24 thereby to induce a resonant motion of the piston 36.

Operation of the reciprocating compressor according to the present invention will be explained as follows.

When the electric power is applied to the winding coil 64 arranged at the inner stator 62, a flux is formed around the winding coil 64. The flux forms a closed loop along with the outer stator 60 and the inner stator 62. By an interaction between the flux formed between the outer stator 60 and the inner stator 62 and a flux formed by the magnet 66, the magnet 66 is linearly-moved in an axial direction. When a direction of a current applied to the winding coil 64 is alternately changed, a direction of the flux of the winding coil 64 is changed and thereby the magnet 66 is linearly-reciprocated.

As the magnet 66 is moved, the magnet frame 32 to which the magnet 66 is fixed is linearly-reciprocated thereby to linearly-reciprocate the piston 36. According to this, a fluid sucked through the suction pipe 10 is introduced into the compression chamber 38 through the fluid passage 42 of the piston 36, and the fluid that has been introduced into the compression chamber 38 is compressed by the reciprocation of the piston 36 and is discharged to the outside through the discharge pipe 12.

As the winding coil 64 is mounted at the inner stator 62, a capacitance of the motor has to be lowered in case of a compressor used in a refrigerator less than 200 W thereby to reduce the usage amount of the coil. Also, since the cheap ferrite based magnet is used as the magnet, the fabrication cost of the motor can be reduced.

Also, the inner stator 62 is formed accordingly as the first stator core 70 and the second stator core 72 facing each other are assembled to each other, thereby enhancing an assembly characteristic and thus enhancing a productivity. Also, since the length of the magnet 66 is reduced by extending the length of the pole portion 92 to the maximum, the fabrication cost of the motor can be reduced.

Additionally, the inner stator 62 is inserted into the outer circumferential surface of the cylinder 40 and then is elastically supported by the first resonance spring 28, so that a fixation intensity of the inner stator 62 is increased. According to this, a processing error and an assembly error between the inner stator 62 and the cylinder 40 are decreased thereby to enhance the productivity.

Also, since the magnet mounting portion 71 of the magnet frame 32 is formed of a non-magnetic substance, the loss of the motor can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A reciprocating compressor comprising:
   a hermetic casing;
   a reciprocating motor arranged in the casing and generating a reciprocation force;
   a compression unit for compressing a fluid by receiving a reciprocation force from the reciprocating motor; and
   frames for supporting the reciprocating motor and the compression unit, wherein the reciprocating motor includes:
   an outer stator supported by the frames;
   an inner stator arranged at an inner circumferential surface of the outer stator with an air gap and at which a winding coil is wound;
   a magnet arranged between the outer stator and the inner stator and linearly-moved when a power is applied to the winding coil; and
   wherein the magnet is mounted at a magnet frame with the same interval, the magnet frame is connected to a piston of the compression unit, and a through hole for passing the resonance spring is formed at the magnet frame.

2. The reciprocating compressor of claim 1, wherein the inner stator is composed of: a first stator core having a plurality of lamination sheets arranged in a radial direction; and a second core facing the first stator core and having a plurality of lamination sheets in a radial direction, and a winding coil is wound at an outer circumferential surface between the first stator core and the second stator core.

3. The reciprocating compressor of claim 2, wherein one side surface of the inner stator is supported by the first frame, and another side surface thereof is supported by a resonance spring.

4. The reciprocating compressor of claim 1, wherein the winding coil is composed of:
   a first winding coil wound on a first bobbin mounted at an outer circumferential surface of the inner stator; and
   a second winding coil wound on a second bobbin mounted at an outer circumferential surface of the first bobbin.

5. The reciprocating compressor of claim 1, wherein the winding coil is composed of:
   a first winding coil wound on an outer circumferential surface of a bobbin mounted at an outer circumferential surface of the inner stator; and
   a second winding coil wound on an outer circumferential surface of the first winding coil with a sectional area different from that of the first winding coil.

6. The reciprocating compressor of claim 1, wherein the magnet is a ferrite based magnet.

7. The reciprocating compressor of claim 1, wherein the magnet frame is formed of a magnetic substance at a part connected to the piston, and is formed of a non-magnetic substance at a part where the magnet is mounted.

* * * * *